July 1, 1941.  D. P. SANDS ET AL  2,247,416
REINFORCED HOSE
Filed Aug. 14, 1939   2 Sheets—Sheet 1
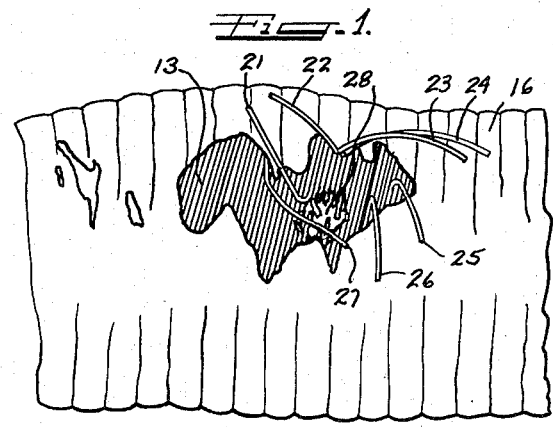
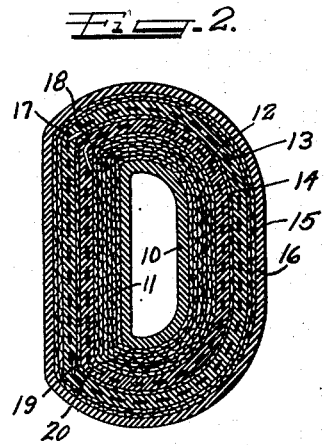
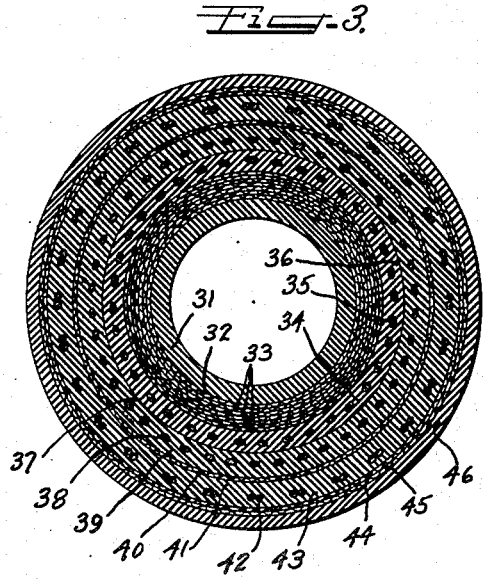
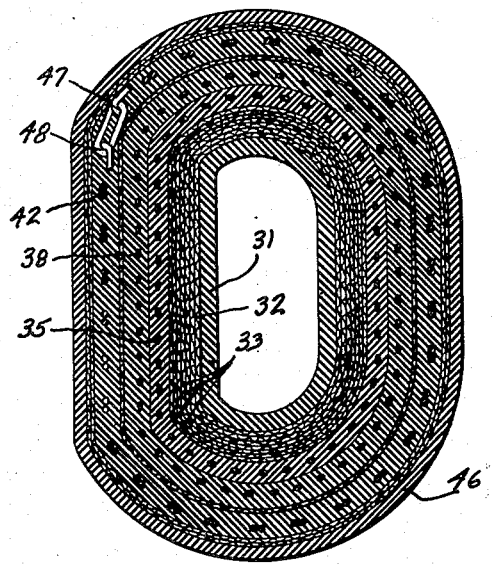
Inventors
David P. Sands.
Herman B. Hendershot.
Frank J. Hinderliter.

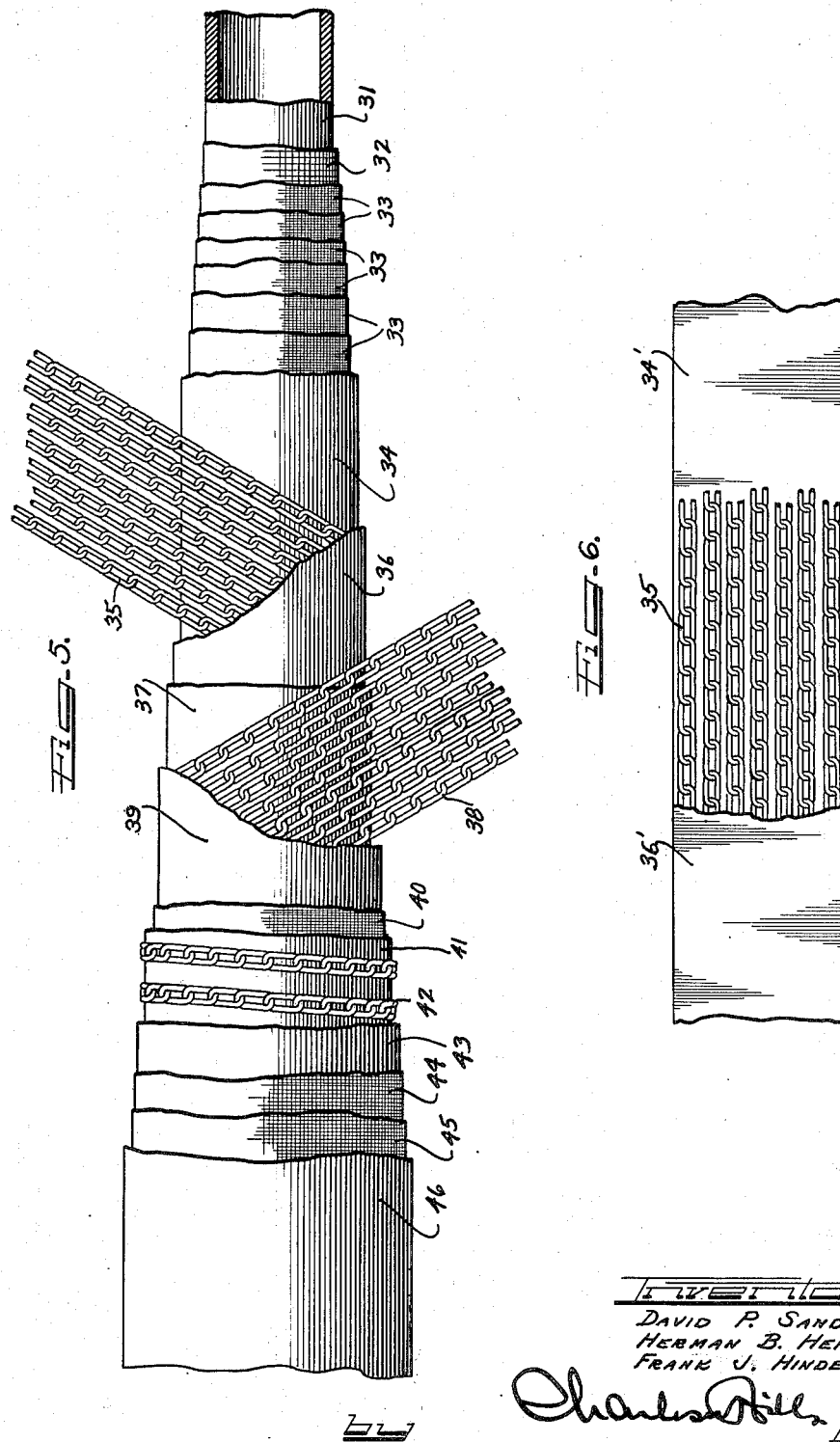

Patented July 1, 1941

2,247,416

UNITED STATES PATENT OFFICE 2,247,416

REINFORCED HOSE

David P. Sands, Herman B. Hendershot, and Frank J. Hinderliter, Tulsa, Okla.

Application August 14, 1939, Serial No. 289,950

3 Claims. (Cl. 138—56)

This invention relates to high pressure hose, and particularly to hose intended to carry fluid under pressure greater than can be carried by fabric hose. One of the most important classes of high pressure hose is the hose known as rotary drill hose, which is employed for handling the drilling fluid or mud in the drilling of deep wells, and it is to this class of hose that this invention relates particularly, although it will of course be understood that the invention is not limited thereto but may be used for any purpose to which it is applicable.

High pressure hose, such as rotary drill hose, is subjected in service to pressures ranging up to several thousand pounds per square inch. The hose is therefore invariably reenforced with wire to enable it to withstand those pressures. In general, it is constructed of layers of rubber, fabric, duck, and steel wire wound upon each other in a suitable order and vulcanized together. The steel wire takes the stress in the hose caused by the internal pressure, the fabric and duck receive the internal pressure and transmit it to the wire, and the rubber makes the duck liquid-tight, binds together the layers of fabric, duck and wire, and protects them from rot, corrosion and abrasion. Thus the entire structure of the hose cooperates to produce the desired result.

However well hose of this type may ordinarily function, it has one serious fault. If the hose is flattened more than a certain amount at any place along its length by external pressure, as often occurs with rotary drill hose around well drilling derricks where heavy objects such as lengths of drill pipe are being handled, the wire in the hose is given a permanent set so that the hose is thereafter slightly flat instead of perfectly round at that place. If the flattening is severe, some of the wires may be broken immediately. In any case, the hose will not be circular in cross-section normally but will be forced more or less into circular shape by the pressure within it when it is in use.

If no wires are broken, no harm might be done by the pressure within the flattened hose if that pressure were uniform. High pressure pumps, however, are almost invariably of the reciprocating or other type producing pulsation of flow and pressure. At each pulsation of pressure, the flattened place in the hose rounds out and between pulsations it flattens down a little. Thus the wires at that place are subjected, not only to the tensile stresses caused by the normal pressure in the hose, but also to the bending stresses caused by repeated flexing. Under these conditions, individual strands of wire eventually fail through fatigue and weaken the hose to the point of total failure.

One of the principal objects of the present invention is to provide a high pressure hose able to withstand severe accidental flattening without subsequent failure.

Another object of this invention is to provide a high pressure hose having great flexibility.

A still further object of this invention is to provide a hose strengthened by steel having a much greater thickness than is practical in wire-strengthened hose and therefore having a greater margin of strength against corrosion in case the protective layers of rubber should be damaged.

In its broadest aspects, the invention contemplates the use of chain as a means of strengthening high pressure hose, the chain preferably being disposed in a plurality of substantially continuous layers and extending in different directions in the different layers in order to resist in the most advantageous manner the stresses to which the hose is subjected. Further, the invention contemplates the use of at least two layers of chain formed of single strands of chain wound side by side and each of at least two of the layers being formed of several separate parallel strands of chain.

Another feature of the invention is the embedding of the strands of chain in rubber with the rubber forced through the individual links to securely interlock the chain and the rubber.

Still another feature of the invention is the use of flat chain as a hose reenforcing means placed with its flat side to receive the internal pressure.

The novel features which we believe to be characteristic of our invention are set forth in greater particularity in the appended claims. Our invention itself, however, both as to its organization and method of operation together with further objects and advantages thereof, may best be understood by reference to the following description taken in connection with the accompanying drawings in which:

Figure 1 is a view of a short section of conventional hose showing the damage resulting from the hose being flattened;

Figure 2 is a cross-section through a conventional hose showing how the reenforcing wire is sharply bent when the hose is flattened;

Figure 3 is a cross-section through one of the preferred embodiments of our invention showing the normally circular shape of the hose;

Figure 4 is a cross-section of the hose shown in Figure 3 and showing the hose flattened as by an impact on one side;

Figure 5 is a view of the embodiment of the invention shown in Figures 3 and 4 with the several layers thereof stripped back to reveal the construction of the hose; and Figure 6 is a view illustrating one step in the construction of the hose shown in Figures 3 to 5.

The way in which an ordinary high pressure hose, reenforced with wire, fails after being accidentally flattened is illustrated in Figures 1 and 2. This hose, as may be seen from Figure 2, is composed of an inner layer of rubber 10 several layers of fabric and duck 11, two or more layers of wire 12, 13, one or more layers of duck 14 between the layers of wire 12 and 13, one or more layers of duck 15 on the outside of the wire and an outer layer of rubber 16. When the hose is partially crushed by the impact of a heavy member, it is distorted from its circular cross-section and flattened out to a shape such as is shown, for example, in Figure 2. When this occurs, the wire in the layers 12 and 13 are sharply bent as shown at 17, 18, 19 and 20. This bending stresses the wires beyond their elastic limit at these points with the result that the hose does not return to its normally circular shape. The effect of this, as explained above is to cause the wires to eventually break and the hose to fail. The final result of this action is shown in Figure 1 which shows a hose which has finally failed by a complete blow out at the point where the reenforcing wires were bent by the original injury. As a result of the original injury, individual wires 21, 22, 23, 24, 25, 26 and 27 have broken, weakening the hose so much that the liquid under pressure within the hose worked through the various layers, causing them to separate and resulting in the loss of part of the outer layer of rubber 16, and eventually causing total failure of the hose by a "blow out" 28.

A hose, which is made according to our invention and which is not subject to failures of the type shown in Figure 1, is illustrated in Figures 3 to 5. This particular embodiment of the invention comprises an inner layer or lining of rubber 31 covered by a layer of fabric 32, six layers of duck 33, a layer of chain 35 embedded between two layers of rubber 34 and 36 and having the chain extending around in a helix, a second layer of chain 38 embedded between two layers of rubber 37 and 39 and having the chain 38 extending around in a helix in the opposite direction than the chain 35 in the first layer of chain, a layer of duck 40 enclosing all of the previous layers, a third layer of chain 42 embedded in two layers of rubber 41 and 43 and having the chain 42 extending around the hose in a helix of very small angles so that the chain 42 lies practically circumferentially, two more layers of duck 44 and 45 and an outer protective layer of rubber 46. All of the layers 31 to 46 are bonded together so that the entire hose forms a single unitary structure.

The inner layer of rubber 31 serves to protect the surrounding layers of fabric 32 and duck 33 from the liquid within the hose and also serves to withstand the abrasive action of the mud or other fluids being pumped through the hose. The inner layers of fabric 32 and duck 33 provide the necessary local strength for the hose and distributes the pressure within the hose against the links of the chain 35 and 38.

The two helical or spiral layers of chain 35 and 38 are the principal means of resisting the internal pressure of the fluid within the hose. As is well known, the pressure of a fluid within a cylinder places the material forming the cylinder under tension, and the circumferential tension is twice as great as the longitudinal tension. If desired, the two layers of chain 35 and 38 may be arranged to withstand the entire circumferential and longitudinal tension without there being any tendency for the hose to swell and shorten or to lengthen and thin down. This is accomplished by winding the chain 35 and 38 at an angle of 26° 34' to a line extending directly around the hose. This angle, it may be noted, is the angle whose tangent is one-half. With the chain 35 and 38 wound in this manner, the circumferential components of the tension in the chain will be exactly twice the longitudinal components, and the structure will be exactly in balance with the internal pressure.

As a practical matter, however, it is better to provide three layers of chain 35, 38 and 42, each extending at an angle to the other, in order to more positively limit the lengthening or swelling of the hose. The third layer which is thus provided is formed of a single strand of chain 42 which is wound around the hose practically circumferentially. The circumferential layer of chain 42 is able to carry a large part of the circumferential tension and thus lessens the amount of circumferential tension which must be carried by the helical or spiral layers of chain 35 and 38, but it does not lessen the amount of longitudinal tension to which these layers are subjected. The circumferential tension carried by the spiral layers 35 and 38 is therefore less than twice as great as the longitudinal tension, and the angle which the chains 35 and 38 in these layers makes with a line drawn directly around the hose is therefore made greater than 26° and 34' so that its tangent will be greater than one-half. The theoretically correct angle is the angle whose sine and cosine are in the same proportion to each other as the longitudinal and circumferential tension carried by the two layers of chain 36 and 38.

The various chains 35, 38 and 42 may be of any suitable kind, but they are preferably formed of links having their ends twisted 90° with respect to each other so that the chains will lie flat with each link of each chain in the same position with respect to the surface of the hose as every other link of that chain.

The manner in which a hose constructed according to the invention reacts when subjected to an external blow may be seen by comparing Figures 3 and 4 which show the hose in sections in its normal circular shape and flattened out on one side respectively. As may be seen from these figures, and by comparing them with Figure 2 which shows a conventional hose subjected to the same treatment, a hose constructed according to the invention flattens out to substantially the same shape as a conventional hose when it is subjected to an external blow, but the circumferential flexibility is provided by the articulations between the links in the reenforcing chain as at 47 and 48. There is thus no abnormal stressing of the metallic reenforcing elements of the hose and they are therefore not deformed beyond their elastic limits. Because of this, when the hose returns to its normal shape after the blow, it will be exactly as before and entirely undamaged, except of course for possible abrasion of the surface which in nowise impairs the strength of the hose. It will be seen, from the above, that we have provided a hose which can receive innumerable blows without impairment of its internal structure and resultant shortening of the useful life of the hose. Thus a hose made in accordance with our invention will ordinarily remain in service for a substantially longer period of time than a hose made in the conventional manner. In addition to this, a hose made in accordance with our invention may be provided with substantially heavier reenforcement than a hose of conventional structure and will therefore be able to carry substantially higher pressures.

The manufacture of hose having the structure described above may be carried out in substantially the same way as the manufacture of conventional hose but it is preferable to make certain modifications. The chains 35 and 38, instead of being wound on to the hose after all of the underlying layers have been placed in position, are assembled with the adjacent layers of rubber before being wound on to the hose.

This step is illustrated in Figure 6 and consists of taking two strips of unvulcanized or raw rubber 34' and 36', placing a number of lengths of chain 35 side by side between the two strips of rubber and passing the assembly thus formed between rollers so as to force the rubber 34' and 36' down between the separate strands of chain 35 and through the individual links of the chains until the two layers of rubber 34' and 36' firmly adhere to each other through and around the chains. There is thus formed a band of parallel chains 38 completely embedded in what is, in effect, a single thick sheet of rubber. The band thus formed is made of such a width so that when it is wound around the hose at the correct angle, the adjacent edges of succeeding turns of the band will be in juxtaposition. Both layers of chains 35 and 38 are assembled in this fashion, and the same method may be used with the circumferential layer of chain 41, which is wound on in a narrow band containing only a single strand of chain. After the hose is completely assembled, it is vulcanized in the customary manner in order to cure all of the layers of unvulcanized rubber and to firmly bond the entire hose together.

From the above description of the present invention it will at once be understood that we have provided a hose able to withstand an extraordinary amount of abuse and which at the same time is extremely flexible and able to withstand very high pressures. Furthermore, hose made according to our invention can be flexed much more often than conventional hose without the metal reenforcement cutting through the rubber or fabric than can conventional hose reenforced with wire, for the chain reenforcement has no edges as sharp as a strand of wire. It will also be seen that we have provided a method of making such a hose in a convenient and satisfactory manner. While we have shown a particular embodiment of our invention, it will of course be understood that we do not wish to be limited thereto, since many modifications may be made, such as by omitting some or adding more layers of chain, or placing the layers in a different order, and using other rubber-like substances in place of rubber. We therefore contemplate by the appended claims to cover all such modifications as fall within the true spirit and scope of our invention.

We claim as our invention:

1. In a reinforced flexible high pressure hose made up of multiple plies of elastic material, a plurality of layers of chain helically wound in said plies, each layer comprising a plurality of parallel individual and separated strands of chain and the chain of one layer being wound in said plies in an opposite direction to that of another layer whereby the links of one layer overlap at an angle the links thereunder of the other layer, said strands of chain being adapted to freely separate or approach each other slightly in the length of the hose as the hose is stressed and flexed.

2. In a hose as defined in claim 1, an additional single strand of chain links helically wound in said plies with a lead less than that of the other strands for limiting the elasticity of the wall of the hose upon flexure of the wall.

3. In a reinforced flexible high pressure hose made up of multiple plies of material, a layer including a plurality of strands of links of chain helically wound in the plies of material lengthwise of the hose with the turns of each strand separated so that links of each turn may freely separate slightly or approach those of the adjoining turns lengthwise of the hose.

DAVID P. SANDS.
HERMAN B. HENDERSHOT.
FRANK J. HINDERLITER.